(12) United States Patent
Ichimaru et al.

(10) Patent No.: US 6,176,494 B1
(45) Date of Patent: Jan. 23, 2001

(54) SUSPENSION CONTROL SYSTEM

(75) Inventors: Nobuyuki Ichimaru, Kanagawa-ken; Masaaki Uchiyama, Tokyo, both of (JP)

(73) Assignee: Tokico, Ltd., Kanagawa-ken (JP)

( * ) Notice: Under 35 U.S.C. 154(b), the term of this patent shall be extended for 0 days.

(21) Appl. No.: 09/220,687

(22) Filed: Dec. 23, 1998

(30) Foreign Application Priority Data

Dec. 26, 1997 (JP) .................................................. 9-367760

(51) Int. Cl.$^7$ .................................................. B60G 17/02
(52) U.S. Cl. .......................................................... 280/5.515
(58) Field of Search .................................. 280/5.515, 5.5, 280/5.514, 5.519; 701/36, 37

(56) References Cited

U.S. PATENT DOCUMENTS 5,175,687 * 12/1992 Tsutsumi et al. ............... 364/424.05
5,802,486 *  9/1998 Uchiyama ............................. 701/37

* cited by examiner

Primary Examiner—Paul N. Dickson
Assistant Examiner—Faye M. Fleming
(74) Attorney, Agent, or Firm—Wenderoth, Lind & Ponack, L.L.P.

(57) ABSTRACT

When a road surface is judged to be undulating and rough, a parameter for a bad road to attain "soft" damping force characteristics is set with priority to setting of a parameter for an undulating road to attain "hard" damping force characteristics. Consequently, "soft" damping force characteristics are obtained to improve the ride quality. This order of the priority is adopted especially when a vehicle speed is low. When the vehicle speed is high, the order of the priority is reversed.

16 Claims, 16 Drawing Sheets

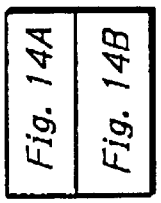
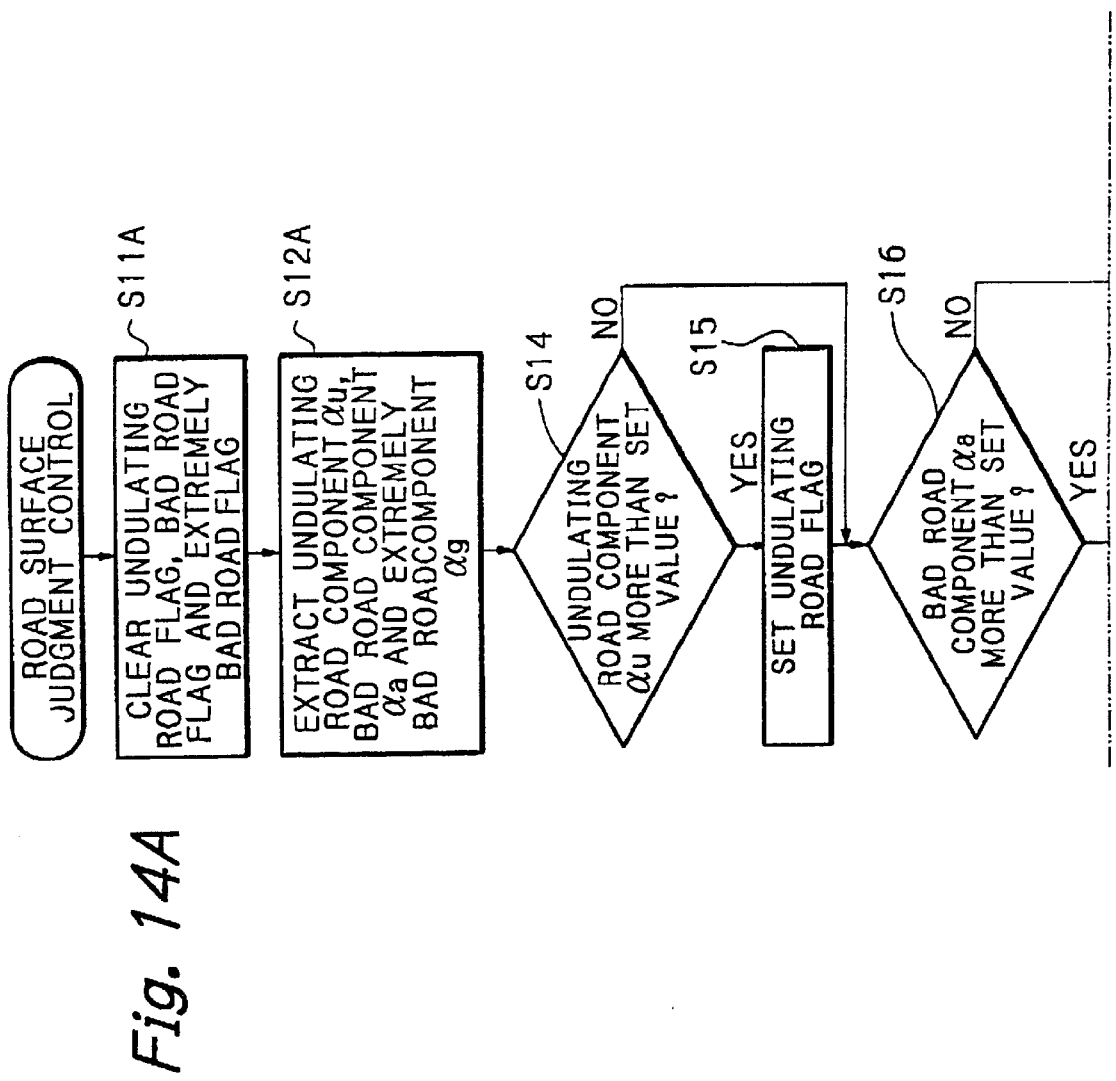
Fig. 14A

SUSPENSION CONTROL SYSTEM

BACKGROUND OF THE INVENTION

The present invention relates to a suspension control system.

One example of a conventional suspension control system is disclosed in Japanese Patent Application Unexamined Publication (KOKAI) No. 7-232530. The conventional suspension control system judges road surface conditions on the basis of the frequency of a signal detected by a vertical acceleration sensor. The term "road surface conditions" means conditions of each particular road, for example, an undulating road that causes a low-frequency vertical acceleration signal to be generated, or a bad road that causes a high-frequency vertical acceleration signal to be generated. Then, the suspension control system adjusts a control signal for an actuator in accordance with the result of the judgment of the road surface conditions, thereby allowing a shock absorber to generate a damping force according to the result of the judgment.

Incidentally, road surface conditions cannot clearly be classified into undulating roads, bad roads, normal roads, etc. Road surface conditions often have both an undulating road component and a bad road component. That is, there are many road surfaces that are both undulating and rough. In other words, there are many cases where when road surface conditions are detected with a vertical acceleration sensor, for example, the detected signal has a high-frequency component superimposed on a low-frequency component. In such cases, according to the above-described prior art, a road that is undulating and rough is judged to be either an undulating road or a bad road, and control adapted for only an undulating road or a bad road determined by the result of the judgment is carried out. Consequently, under circumstances where steering stability if important, control for a bad road may be carried out (i.e. damping force characteristics may be set "soft"), causing the vehicle steering stability to be impaired. Alternatively, under circumstances where ride quality should be given priority, control for an undulating road may effected (i.e. damping force for a characteristics may be be set "hard"), causing the ride quality to be degraded. Thus, the prior art is likely to fail to take full advantage of a predetermined degree of importance in the suspension control.

SUMMARY OF THE INVENTION

In view of the above-described circumstances, an object of the present invention is to provide a suspension control system wherein even when it is judged that the present road surface falls into a plurality of different categories for road surface conditions, it is possible to ensure an improvement in the ride quality or in the steering stability appropriately according to the degree of importance.

The present invention provides a suspension control system including a shock absorber interposed between the body of a vehicle and an axle. The shock absorber is capable of controlling damping force through an actuator. A road surface condition detecting device outputs a signal corresponding to road surface conditions. An extraction device extracts at least two different vibration components from the signal output from the road surface condition detecting device. A damping force control device effects predetermined damping force control for each of the vibration components when the level of the vibration component exceeds a predetermined value. The damping force control device controls damping force according to a predetermined order of priority when the levels of at least two of the vibration components simultaneously exceed the respective predetermined values.

According to one embodiment of the present invention, the damping force control device effects damping force control for a high-frequency vibration component with priority relative to damping force control for a low-frequency vibration component.

According to another embodiment of the present invention, when the vehicle speed is low, the damping force control device effects damping force control for a high-frequency vibration component with priority relative to damping force control for a low-frequency vibration component, whereas when the vehicle speed is high, the damping force control device effects damping force control for a low-frequency vibration component with priority relative to damping force control for a high-frequency vibration component.

DETAILED DESCRIPTION OF THE INVENTION

Figure 1:
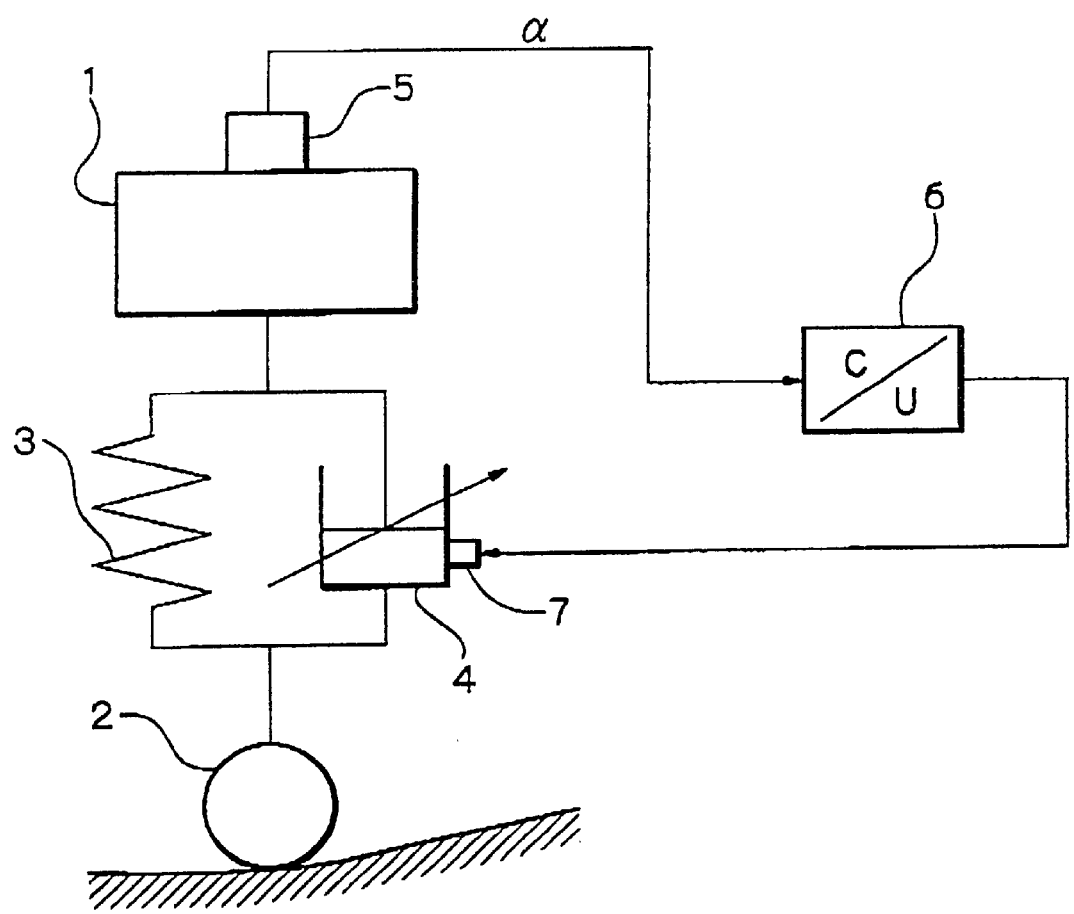
FIG. 1 is a diagram schematically showing a suspension control system according to the first embodiment of the present invention.
Figure 2:
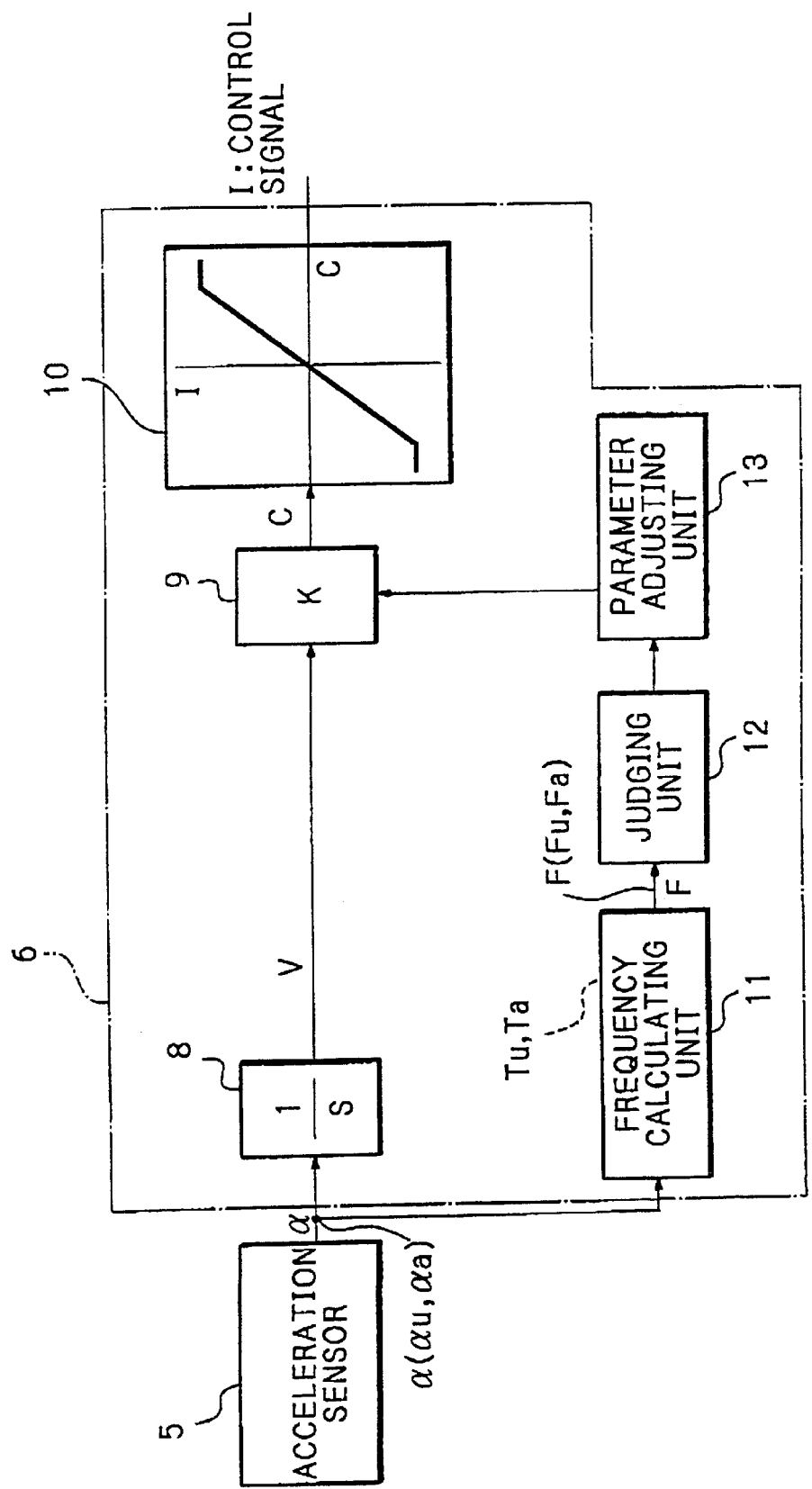
FIG. 2 is a block diagram showing a controller in FIG. 1.

A suspension control system according to a first embodiment of the present invention will be described below with reference to FIGS. 1 to 10. In FIG. 1, a vehicle body 1 constitutes a vehicle that has four wheels 2 (only one of them is shown in the figure). A spring 3 and a shock absorber 4 capable of controlling damping force are interposed in parallel between the vehicle body 1 and the axle (not shown) of each wheel 2 to support the vehicle body 1. An acceleration sensor (road surface condition detecting device) 5 is mounted on the vehicle body 1 to detect a vertical acceleration acting on the vehicle body 1. An acceleration signal α from the acceleration sensor 5 is supplied to a controller 6. It should be noted that four combinations of a shock absorber 4 and a spring 3 are provided for the four wheels 2, respectively. For the sake of convenience, only one of them is shown in the figure.

The shock absorber 4 is provided with and actuator 7. The actuator 7 drives adamping force generating mechanism (not shown) of the shock absorber 4 on the basis of a control signal I from the controller 6. Thus, the shock absorber 4 generates damping force according to the control signal I, and the damping force can be controlled on the basis of the control signal I.

The controller 6 includes an integral processing unit 8, a control command calculating unit 9, a control signal delivering unit 10, a frequency calculating unit 11, a judging unit (road surface condition judging device) 12, and a parameter adjusting unit (parameter adjusting device) 13. The integral processing unit 8 integrates the acceleration signal α from the acceleration sensor 5 to obtain a vertical absolute velocity V and outputs it to the control command calculating unit 9.

The control command calculating unit 9 multiplies the vertical absolute velocity V by a control gain K to obtain a control command C and outputs it to the control signal delivering unit 10. The control signal delivering unit 10 delivers a control signal I on the basis of the control command C and outputs the control signal I to the actuator 7. In this case, the control signal delivering unit 10 has been stored with information representing the relationship between a control command C set on the basis of the characteristics of the shock absorber 4 and a control signal I approximately proportional to the control command C (for the sake of convenience, a graph showing the information is illustrated in the block representing the control signal delivering unit 10 in FIG. 2). In response to entry of acontrol command C, the control signal delivering unit 10 generates a corresponding control signal I.

On receipt of the control signal I, the actuator 7 drives the damping force generating mechanism (not shown) so that the shock absorber 4 can obtain desired extension- and contraction-side damping forces.

Figure 10:
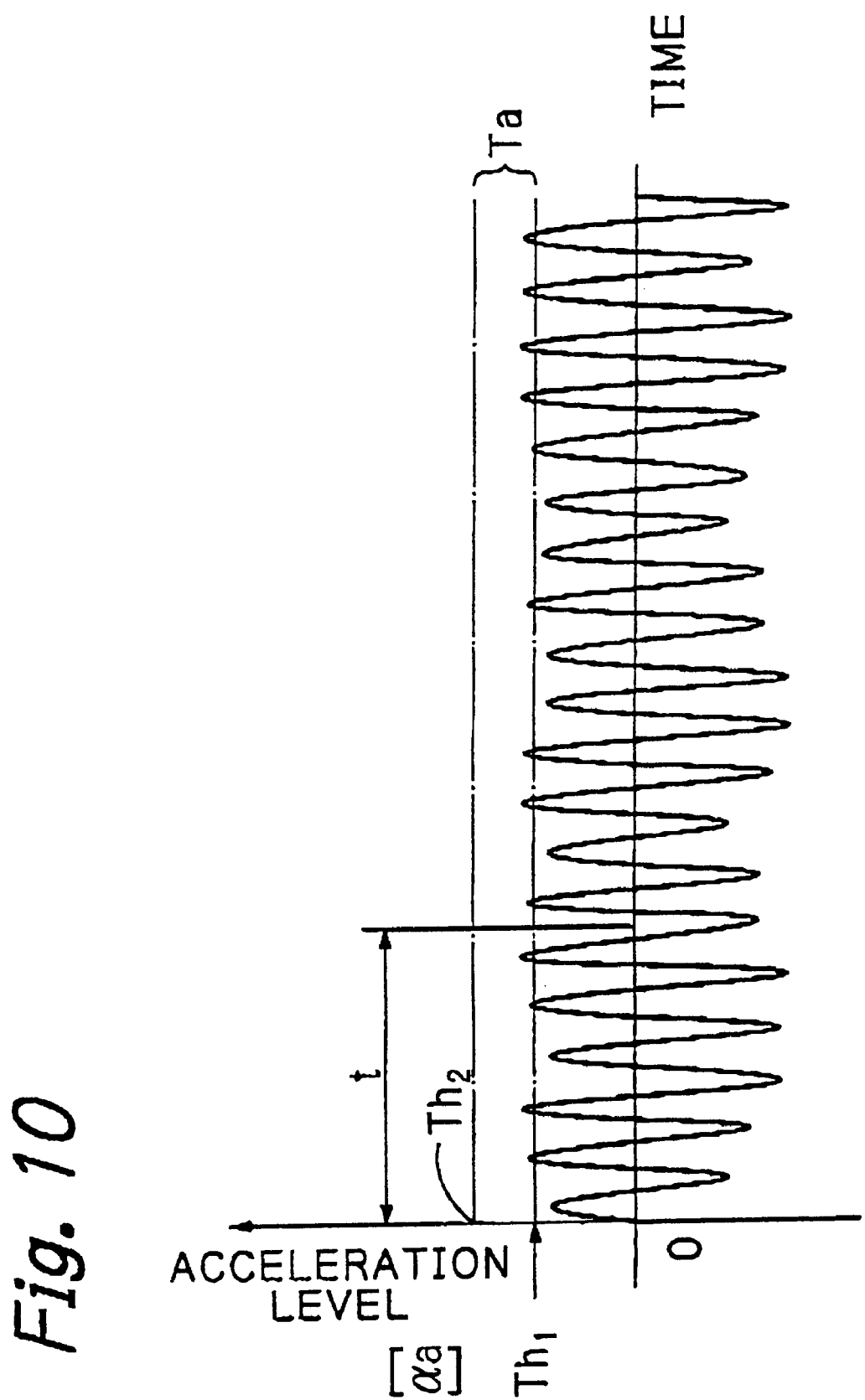
FIG. 10 is a diagram showing the function of a frequency calculating unit.

The frequency calculating unit 11 has reference range data Tu for an undulating road and reference range data Ta for a bad road. As shown in FIG. 10 by way of example, the reference range data Ta for a bad road is given in the range of from a first reference value $Th_1$ for a bad road to a second reference value $Th_2$ for a bad road ($Th_1<Th_2$). A range is similarly determined with respect to the reference range data Tu for an undulating road. The frequency calculating unit 11 calculates frequencies (vibration component levels) Fu and Fa of the undulating road component αu and bad road component αa of the acceleration signal α from; the acceleration sensor 5. More specifically, the frequency calculating unit 11 calculates the number of times the amplitude value of the undulating road component αu falls within the reference range data Tu in a predetermined time t (e.g. 500 ms) to determine Fu (see step S12). The frequency calculating unit 11 further calculates the number of times the amplitude value of the bad road component αa falls within the reference range data Ta in a predetermined time t (e.g. 500 ms) to determine Fa (see step S13). Hereinafter, Fu and Fa will be generally called "the frequency F for judgment" as occasion demands. The frequency calculating unit 11 outputs the frequency F for judgment to the judging unit 12.

The judging unit 12 judges road surface conditions (undulating road, bad road, or normal road) on the basis of the frequencies Fu and Fa for judgment obtained by the frequency calculating unit 11, as stated below, and outputs the result of the judgment to the parameter adjusting unit 13. More specifically, if it is judged that the frequency Fu, that is, the number of times the undulating road component αu falls within the reference range data Tu for an undulating road in the predetermined time, is more than a preset value (predetermined value) (i.e. if YES if the answer at step S14), the judging unit 12 judges the present road surface to be undulating and sets an undulating road flag (step S15). If it is judged that the frequency Fa, that is, the number of times the bad road component αa falls within the reference range data Ta for a bad road, is more than a preset value (i.e. if YES is the answer at step S16), the judging unit 12 judges the present road surface to be rough and sets a bad road flag (step S17). In this embodiment, when neither the undulating road flag nor the bad road flag is set, the road surface is judged to be normal.

The parameter adjusting unit 13 adjusts the control gain K according to the result of the judgment made by the judging unit 12. When the judging unit 12 judges that "the road surface is undulating", the parameter adjusting unit 13 sets a control gain K for an undulating road (i.e. a control gain K for improving vibration-damping properties). When the judging unit 12 judges that "the road surface is rough", the parameter adjusting unit 13 sets a control gain K for a bad road (i.e. a control gain K for preventing the ride quality from degrading). When the result of the judgment contains two decisions, i.e. "undulating road" and "bad road", the parameter adjusting unit 13 sets the control gain K for a bad road with priority relative to setting of the control gain K for an undulating road.

When the control gain K for an undulating road is set, the control signal I is adjusted so that the shock absorber 4 generates large damping force (i.e. "hard" damping force characteristics) to improve the vibration-damping properties. When the control gain K for a bad road is set, the control signal I is adjusted so that the shock absorber 4 generates relatively small damping force (i.e. "soft" damping force characteristics) to improve the ride quality.

Figure 6:
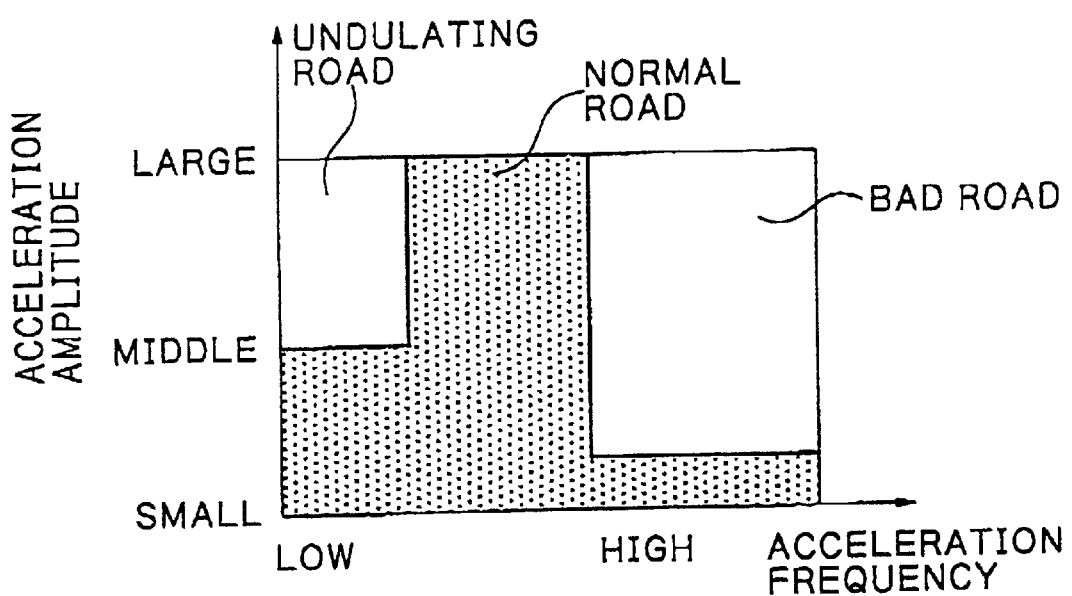
FIG. 6 is a diagram schematically showing road surface condition judgment criteria in the first embodiment.

In this embodiment, road surface conditions are classified as shown in FIG. 6 and Table 1 below. Based on this classification, the calculation of the frequency F for judgment by the frequency calculating unit 11 and so forth are performed.

TABLE 1

|  | Amplitude of acceleration signal α | Frequency of acceleration signal α |
|---|---|---|
| Undulating road | middle to large | low |
| Bad road | small to middle | high |
| Normal road | Other than the above | |

Figure 5:
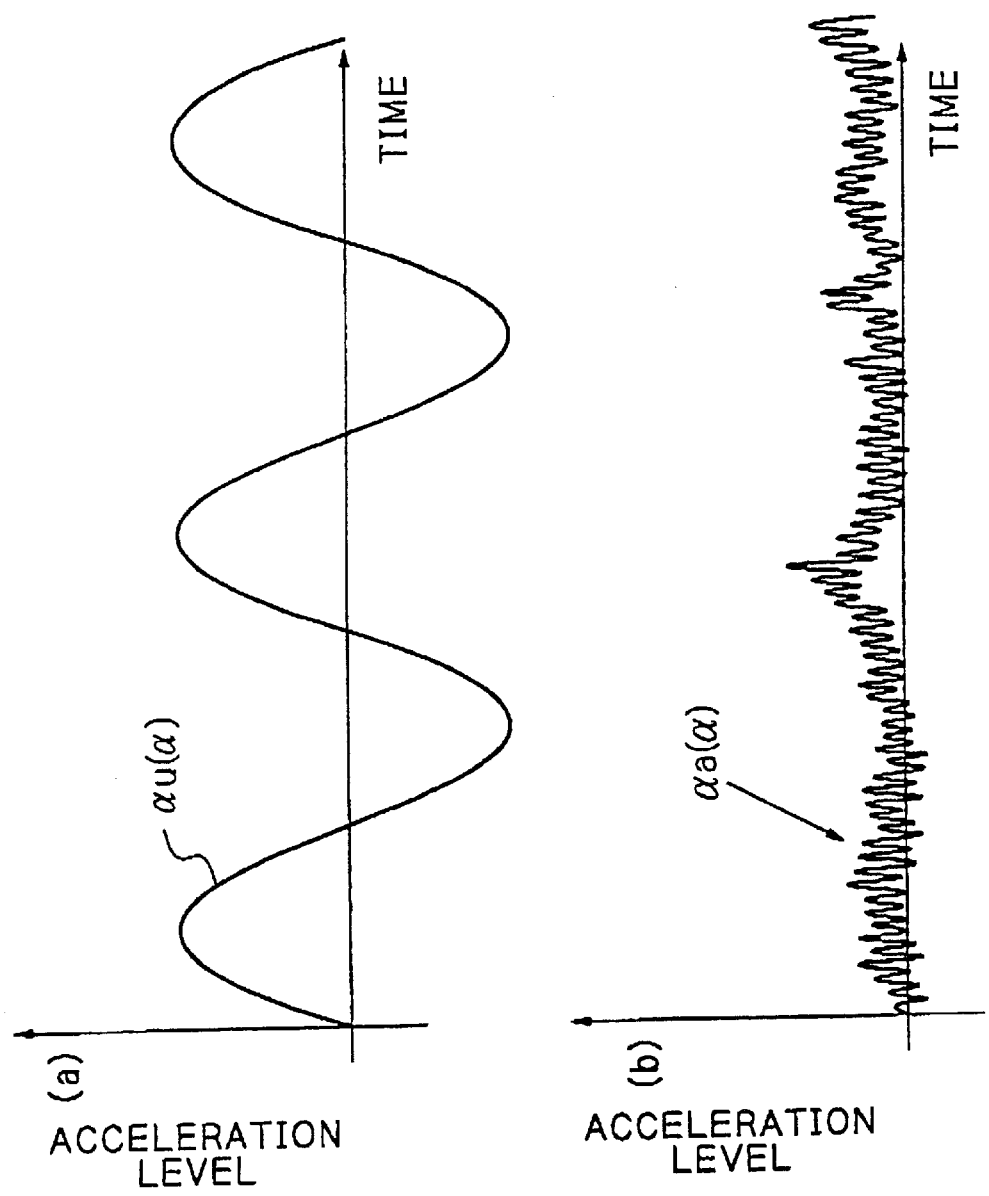
FIG. 5 is a diagram showing the contents of the detection performed with an acceleration sensor in FIG. 1.
Figure 7:
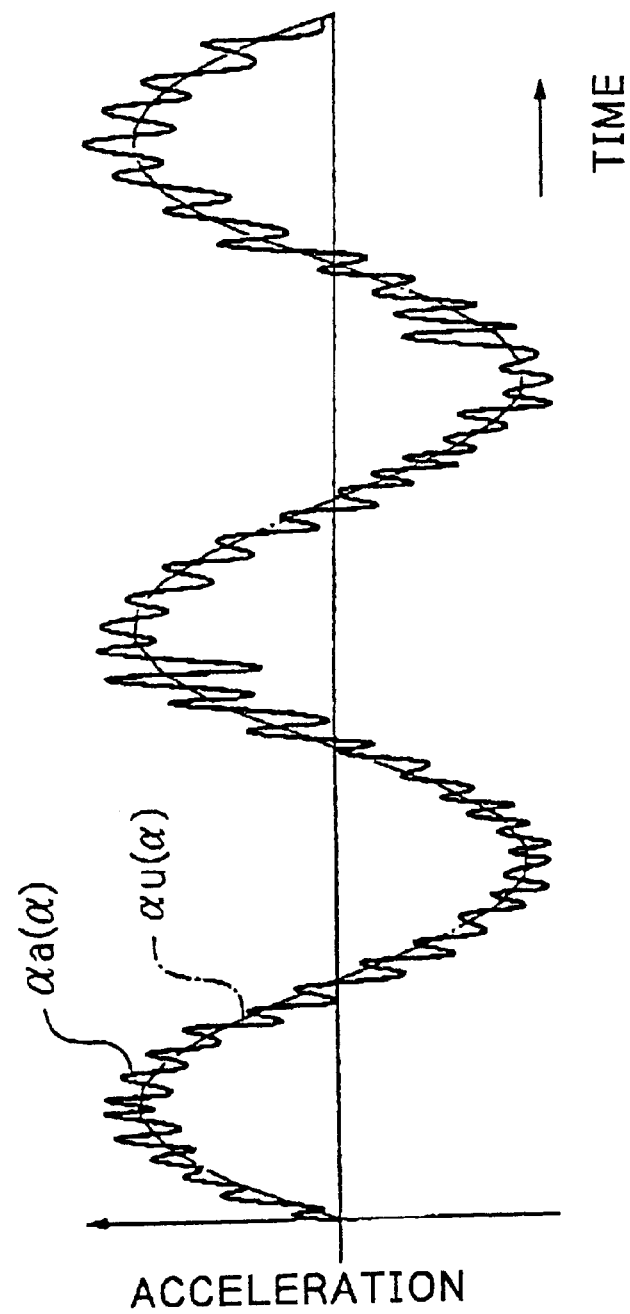
FIG. 7 is a waveform chart showing one example of the contents of a signal generated when an undulating road component and a bad road component are superimposed on one another.

When the vehicle is running on an undulating road, the acceleration sensor 5 generates an acceleration signal α having a low frequency (corresponding to the undulating road component αu) and amiddle to large amplitude as shown in part (a) of FIG. 5 by way of example. When the vehicle is running on a bad road, the acceleration sensor 5 generates an acceleration signal α having a high frequency (corresponding to the bad road component αa) and a small to middle amplitude as shown in part (b) of FIG. 5 by way of example. When the vehicle is running on a road surface that is undulating and rough, the acceleration sensor 5 generates an acceleration signal α having a high-frequency component superimposed on a low-frequency component (i.e. containing both the undulating road component αu and the bad road component αa) as shown in FIG. 7 by way of example.

Figure 3:
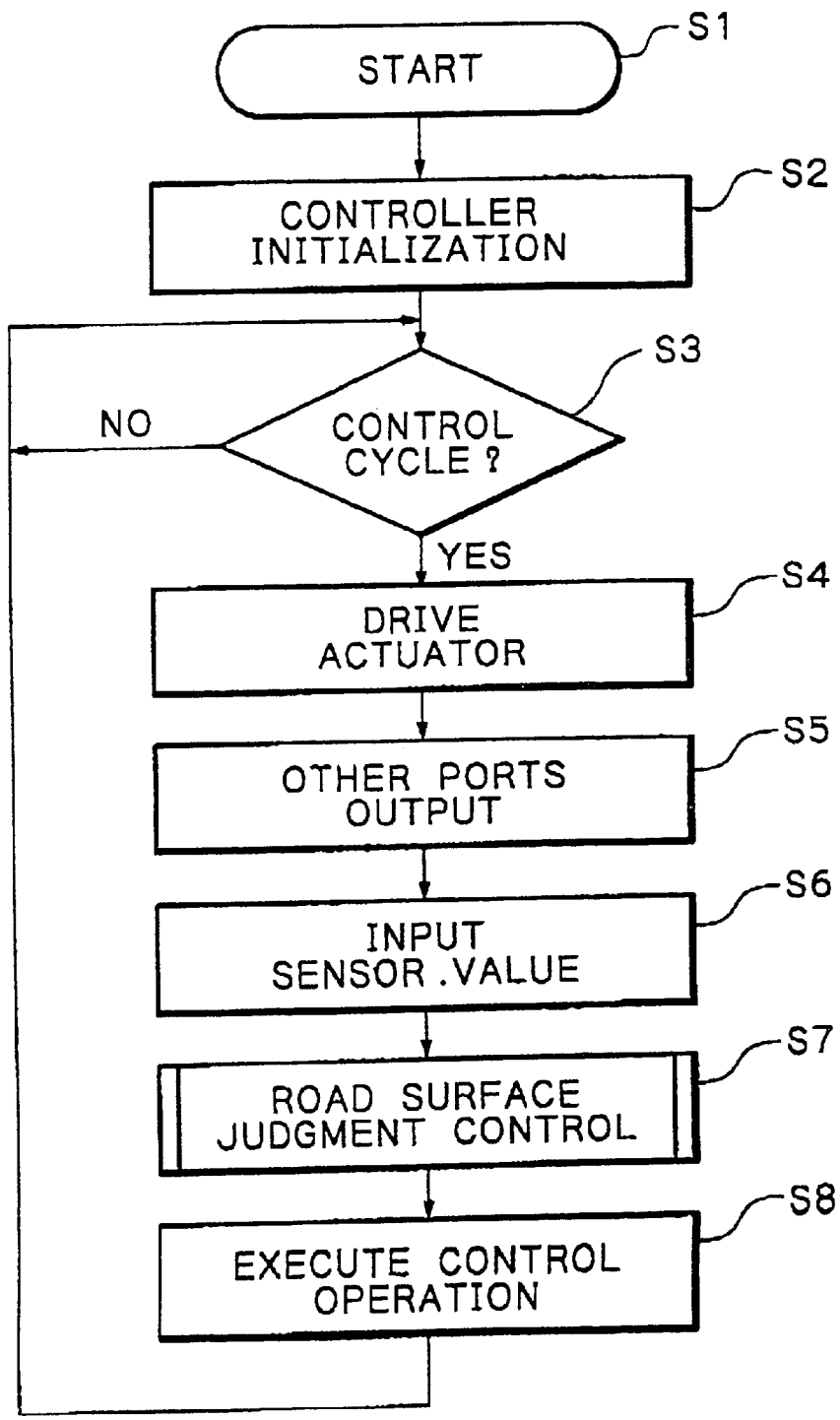
FIG. 3 is a flowchart showing the contents of control executed by the controller in FIG. 1.

The controller 6, which is arranged as stated above, executes control as shown in FIG. 3. When it is supplied with electric power in response to starting of the engine of the vehicle (step S1), the controller 6 performs initialization (step S2). Then, the controller 6 judges whether or not a predetermined control cycle has been reached (step S3). At step S3, the controller 6 repeats the judging process until it is judged that the control cycle has been reached.

When it is judged at step S3 that the control cycle has been reached, the controller 6 drives the actuator 7 (step S4). At the subsequent step S5, the controller 6 outputs signals to mechanisms other than the actuator 7 to control it. Then, the controller 6 reads an acceleration signal α from the acceleration sensor 5 (step S6). Subsequently, the controller 6 judges road surface conditions (step S7). the controller 6 obtains a control command C on the basis of the result of the judgment at step S7 and drives the actuator 7 with a control signal I corresponding to the control command C to obtain desired damping force.

A road surface judgment control subroutine at step S7 will be described with reference to FIG. 4. At step S11, the undulating road flag and the bad road flag are cleared. Then, an undulating road component αu is extracted [step S12 (extraction device)]. At the subsequent step S13 (extraction advice), a bad road component αa is extracted. The extraction of the undulating road component αu at step S12 is executed by subjecting the acceleration signal α to a low-pass filter (LPF) processing. The extraction of the bad road component αa at step S13 is executed by subjecting the acceleration signal α to high-pass filter (HPF) processing.

When the road surface is undulating, the acceleration sensor 5 generates an acceleration signal α having a low-frequency component [undulating road component αu; see part (a) of FIG. 5)]. In response to the acceleration signal α, the undulating road component αu (frequency data; see FIG. 8) is extracted by the low-pass filtering process at step S12.

When the road surface is rough, the acceleration sensor 5 generates an acceleration signal α having a high-frequency component [bad road component αa; see part (a) of FIG. 5], and the bad road component αa (frequency data; see FIG. 9) is extracted by the high-pass filtering process at step S13.

Figure 8:
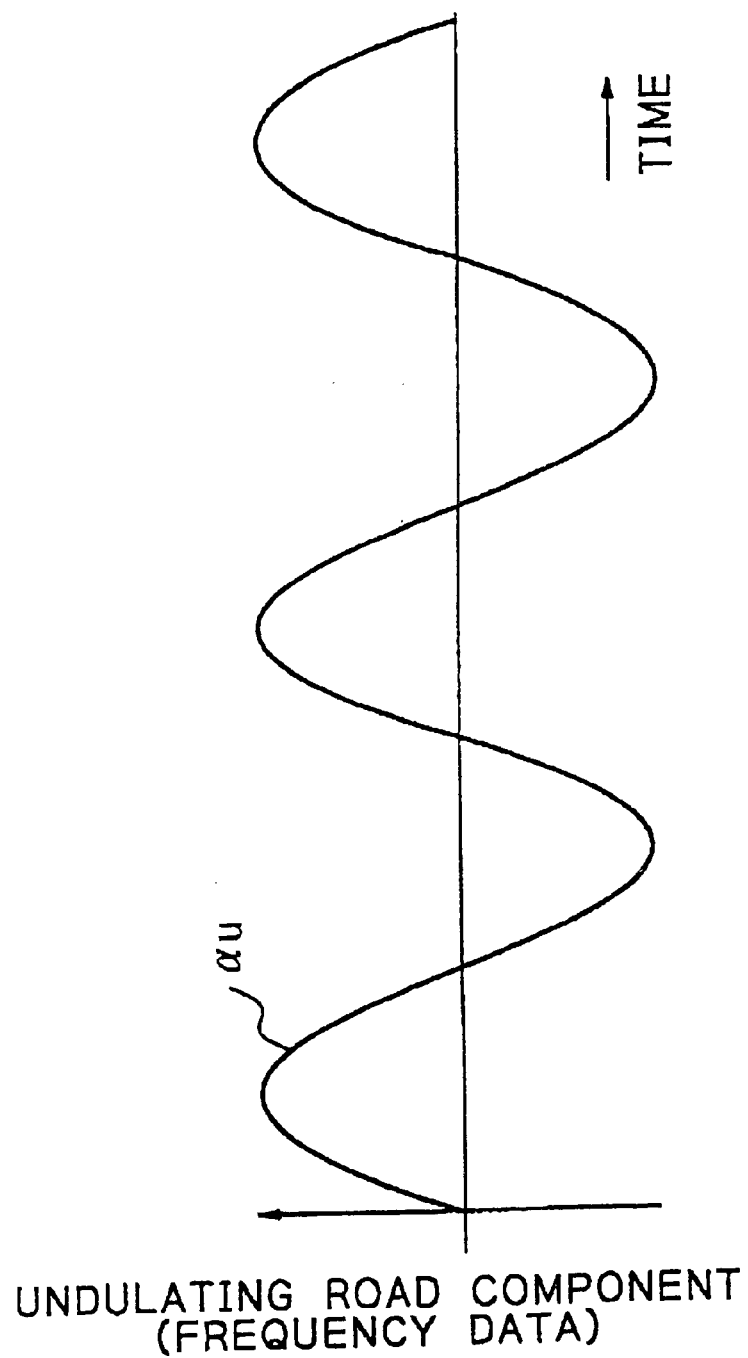
FIG. 8 is a waveform chart showing the undulating road component extracted from the signal shown in FIG. 7.
Figure 9:
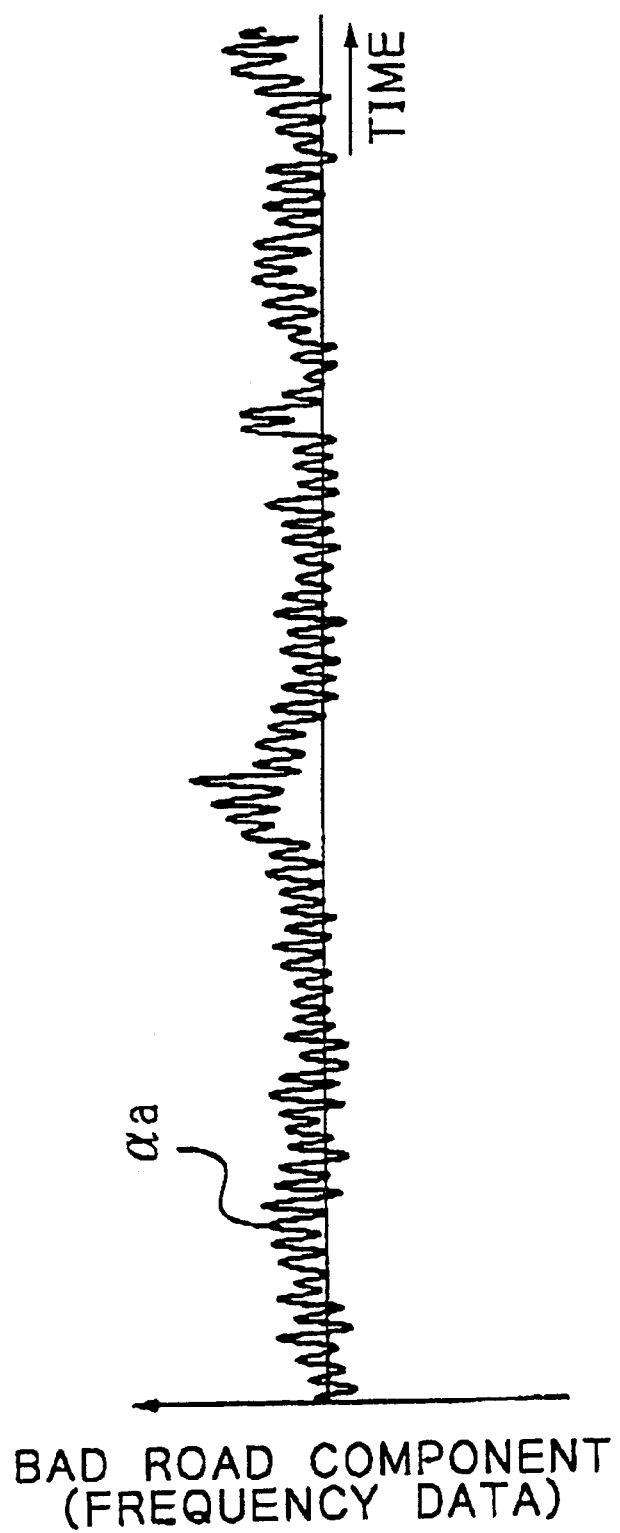
FIG. 9 is a waveform chart showing the bad road component extracted from the signal shown in FIG. 7.

When the road surface is undulating and rough, the acceleration sensor 5 generates an acceleration signal α having a high-frequency component (bad road component αa) superimposed on a low-frequency component (undulating road component αu) as shown in FIG. 7. In this case, the undulating road component αu (frequency data) is extracted as shown in FIG. 8 by the low-pass filtering process at step S12, and the bad road component αa (frequency data) is extracted as shown in FIG. 9 by the high-pass filtering process at step S13.

Subsequently to step S13, it is judged whether or not the frequency Fu, that is, the number of times the amplitude value of the acceleration signal α indicating the undulating road component αu extracted at step S12 falls within the reference range data Tu for an undulating road in a predetermined time, is more than a present value (step S14).

If YES is the answer at step S14, an undulating road flag is set (step S15).

Subsequently to step S15, it is judged whether or not the frequency Fa, that is, the number of times the amplitude value of the acceleration signal α indicating the bad road component αa extracted at step S14 falls within the reference rang data Ta for a bad road in a predetermined time, is more than a preset value (step S16).

Is YES is the answer at step S16, a bad road flag is set (step S17).

If NOT is the anwer at step S14, the process proceeds to step S16. If NO is the answer at step S16, the process proceeds to step S18 (described later).

Subsequently to step S17, it is judged whether or not a bad road flag has been set (step S18).

If YES if the answer at step S18, a control parameter for a bad road is set (step S19), and this subroutine is terminated.

If NO is the answer at step S18, it is judged whether or not an undulating road flag has been set (step S20).

If YES is the answer at step S20, a control gain K for an undulating road (i.e. a control parameter for an undulating road) is set (step S21), and this subroutine is terminated.

If NO is the answer at step S20, a control gain K for a normal road (i.e. a control parameter for a normal road) is set (step S22), and this subroutine is terminated.

In the suspension control system arranged as stated above, when the vehicle is running on a bad road, the answer at step S14 is NO, and the answer at step S16 is YES. Consequently, a bad road flag is set at step S17. In this case, the answer at step S18 is YES, and a parameter for a bad road is set (step S19). Accordingly, damping force characteristics are set "soft", and thus favorable ride quality is ensured.

When the vehicle is running on the undulating road, the answer at step S14 is YES, and the answer at step S16 is NO. Because the answer at step S14 is YES, an undulating road flag is set at step S15. In this case, the answer at step S20 is YES, and a parameter for an undulating road is set (step S21). Consequently, damping force characteristics are set "hard", and thus favorable steering stability is ensured.

When the vehicle is running on a road where the road surface is undulating and rough, that is, a high-frequency component is superimposed on a low-frequency component, the answers at steps S14 and S16 are YES. Consequently, an undulating road flag is set at step S15, and a bad road flag is set at step S17.

In this case, the judging process (as to whether or not a bad road flag has been set) at step S18 is executed with priority relative to the judging process (as to whether or not an undulating road flag has been set) at step S20. Consequently, when the answer at step S18 is YES, a parameter for a bad road is set (step S19). Therefore, when the road surface is judged to be undulating and rough, a parameter for a bad road (to attain "soft" damping force characteristics) is set with priority relative to setting of a parameter for an undulating road (to attain "hard" damping force characteristics).

Accordingly, when the road surface is judged to be undulating and rough, the damping force characteristics are made "soft", and thus the ride quality can be improved. With the above-described prior art, when the road surface is judged to be undulating and rough, the undulating road surface condition and the bad road surface condition are equally handled. Therefore, it is not always clear how control will be effected based on which of the two road surface conditions, and it is likely to fail to effect control of higher degree of importance [in this embodiment, control by a parameter for a bad road (to attain "soft" damping force characteristics)]. In contrast, according to this embodiment, it is possible to effect control of higher degree of importance (i.e. when the road surface is judged to be undulating and rough, control for a bad road is effected with priority relative to the control for an undulating road), and hence possible to improve the ride quality. Accordingly, the driver and other occupants will not have an uneasy feeling.

Figure 11:
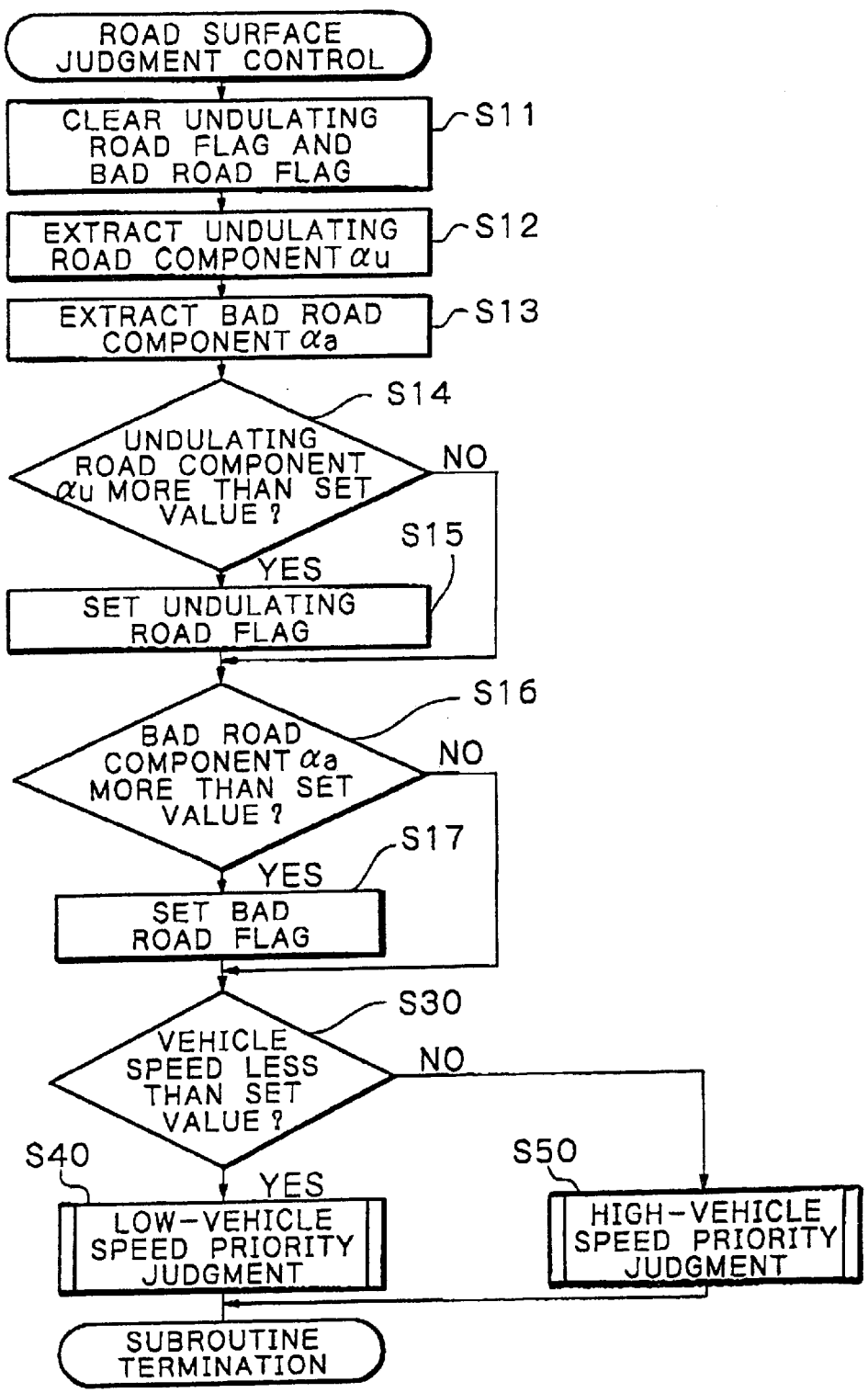
FIG. 11 is a flowchart showing a second embodiment of the present invention.

Next, a second embodiment of the present invention will be described with reference to FIGS. 11 to 13. The second embodiment differs from the first embodiment in that steps S30, S40 and S50, which are shown in FIGS. 11 to 13, are provided in place of steps S18 to S22, which are shown in FIG 4.

According to the second embodiment, when NO is the answer at step S16 (at which a judgment is made as to whether or not the number of times the amplitude value of the bad road component αa falls within the reference range data Ta for a bad road in a predetermined time is more than a set value), or when the process at step S17 (at which a bad road flag is set) is executed, it is judged at step S30 whether or not the vehicle speed detected with a vehicle speed sensor (not shown) is less than a set value (vehicle speed set value). the set value is set according to environments where the vehicle is used (it is generally set in the range of approximately from 50 km.h to 100 km/h). If YES is the answer at step S30, a low-vehicle speed priority judging subroutine is executed (step S40). If NO is the answer at step S30, a high-vehicle speed priority judging subroutine is executed (step S50).

Figure 4:
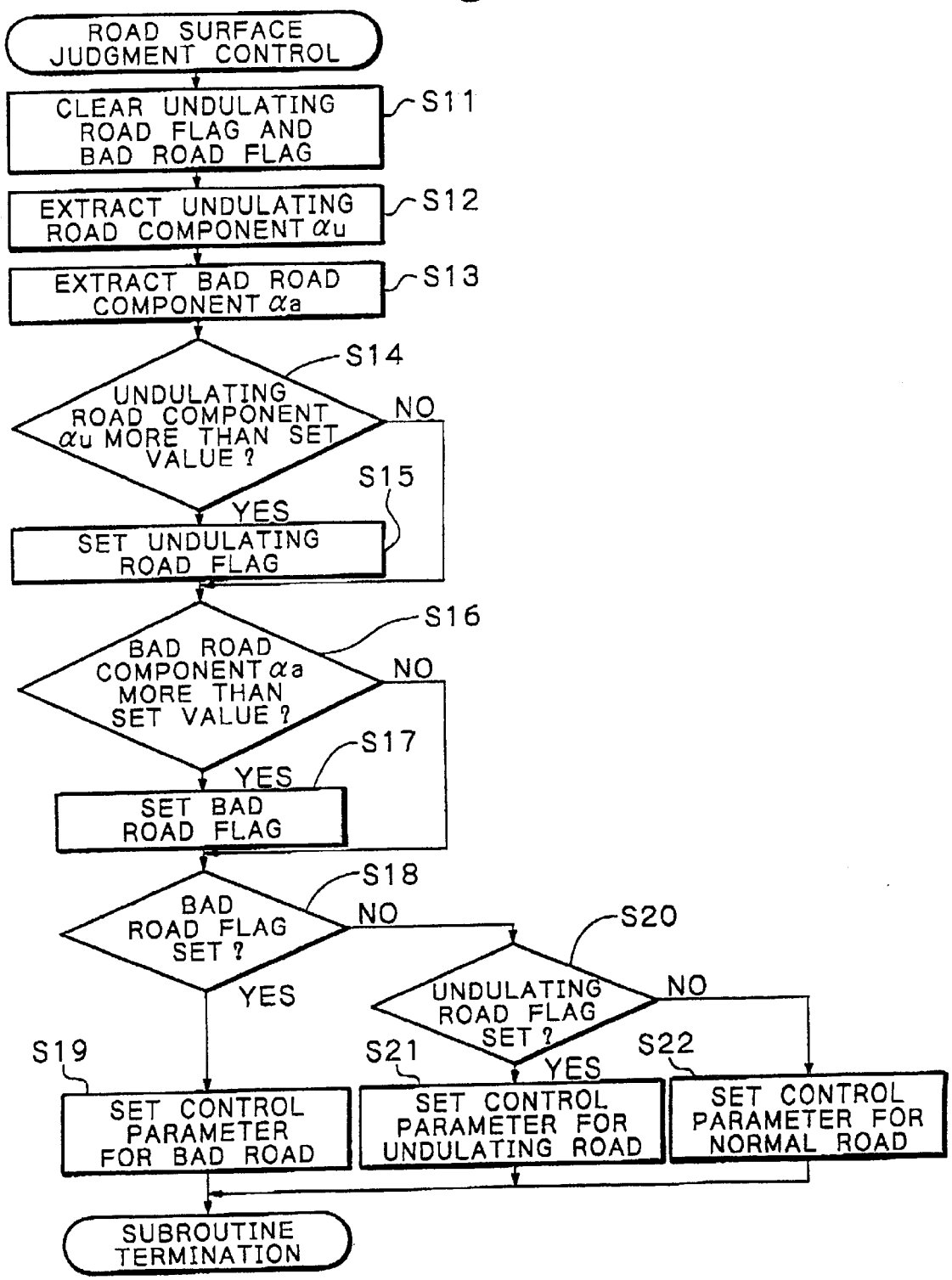
FIG. 4 is a flowchart showing a road surface judgment control subroutine in FIG. 3.
Figure 12:
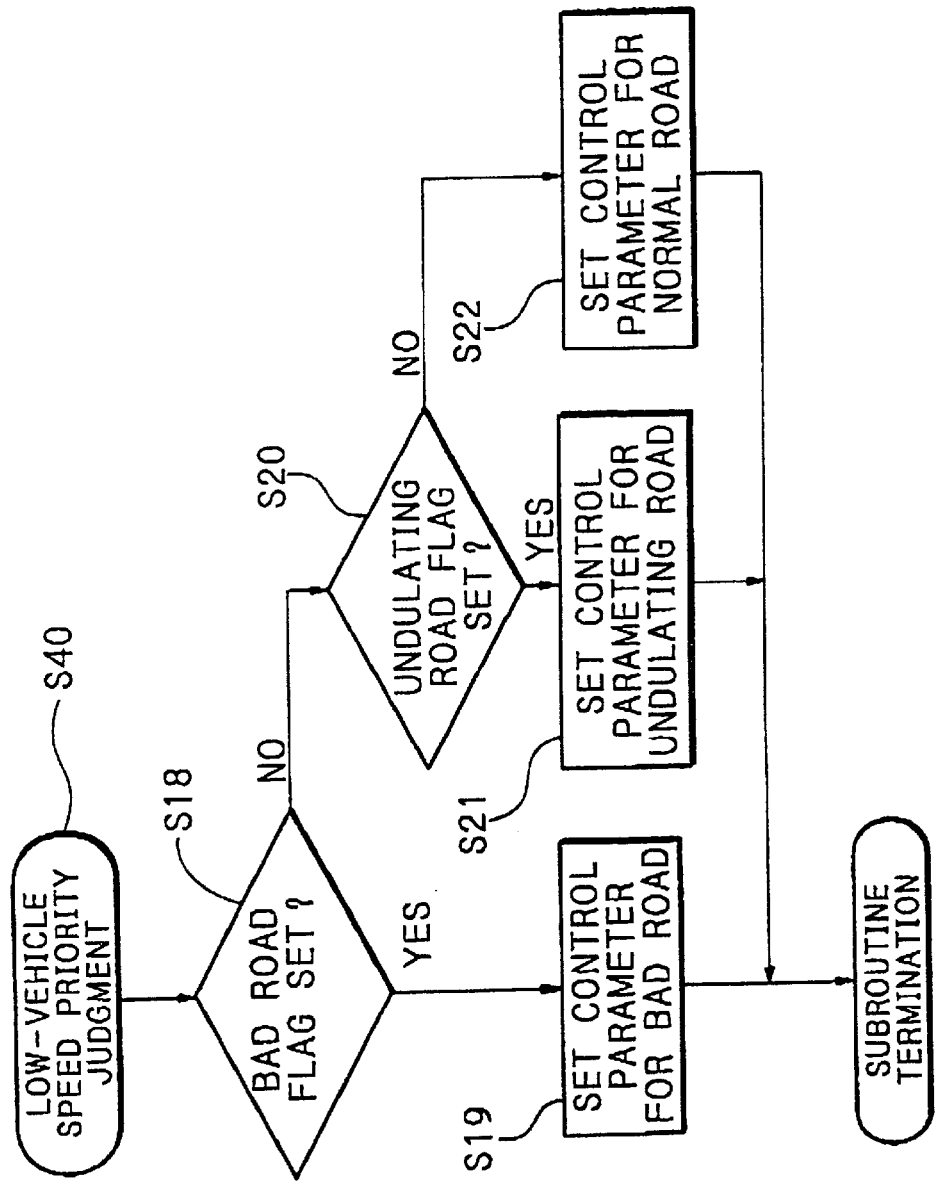
FIG. 12 is a flowchart showing a low-vehicle speed priority judging subroutine in FIG. 11.
Figure 13:
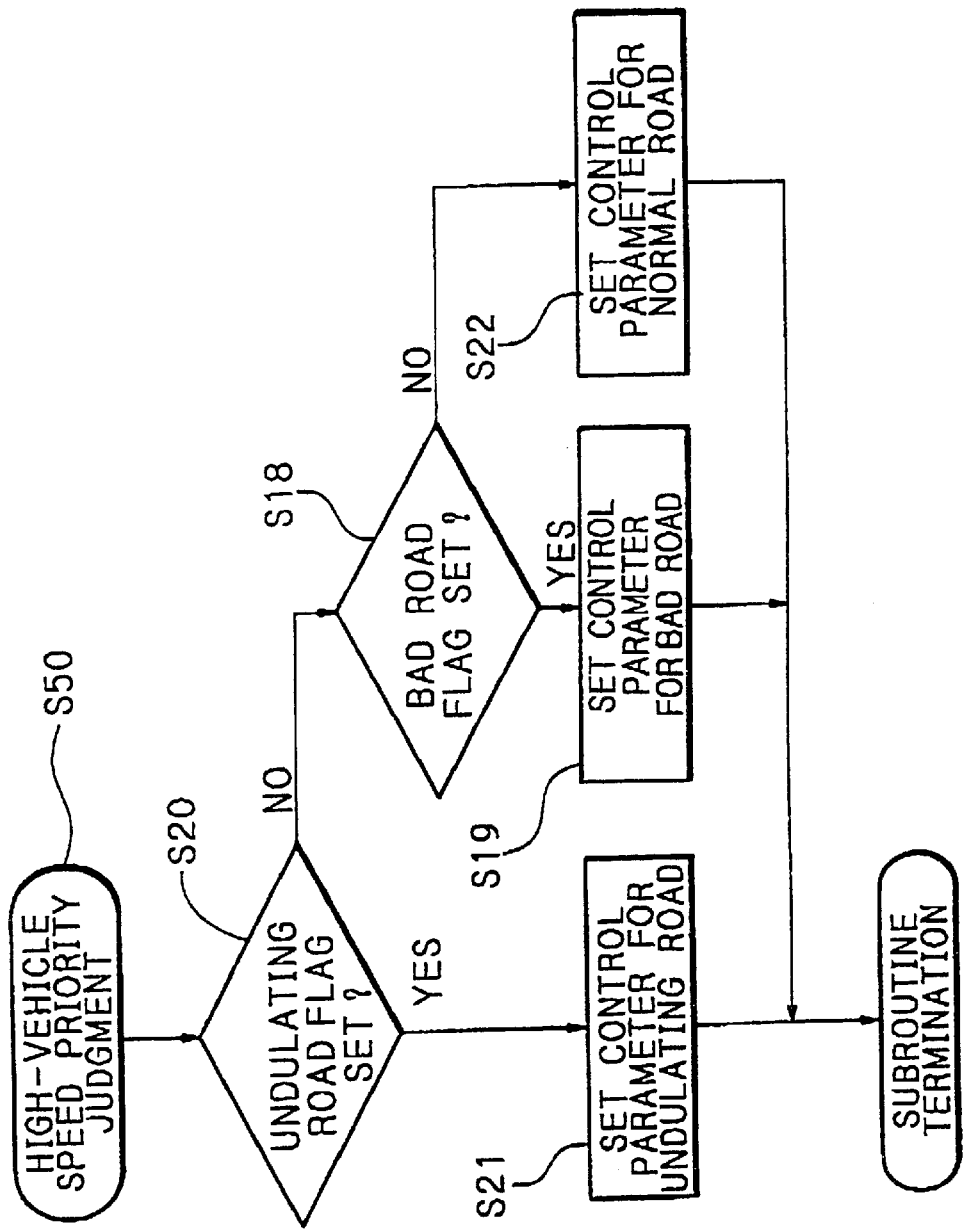
FIG. 13 is a flowchart showing a high-vehicle speed priority judging subroutine in FIG. 11.

In the low-vehicle speed priority judging subroutine at step S40, as shown in FIG. 12, the processes at steps S18 to S22 are executed as in the case of those shown in FIG. 4. When it is judged that the vehicle is running at low speed on a road surface that is rough and undulating, a control gain K for a bad road is set (to attain "soft" damping force characteristics) with priority relative to setting of a control gain K for an undulating road,thereby ensuring favorable ride quality.

When the vehicle is running at low speed, a low-frequency component (undulating road component αu) is not easily transmitted, whereas a high-frequency component (bad road component αa) is readily transmitted. According to this embodiment, when it is judged that the vehicle is running at low speed on a road surface containing both a bad road component αa and an undulating road component αu (i.e. the road surface is rough and undulating), a control gain K for a bad road is set with priority relative to setting of a control gain K for an undulating road, thereby reliably ensuring favorable ride quality.

Unlike the subroutine (FIG. 12) at step S40, the high-vehicle speed priority judging subroutine at step S50 is arranged as shown in FIG. 13. The judging process at step S20 (as to whether or not an undulating road flag has been set) is executed prior to the judging process at step S18 (as to whether or not a bad road flag has been set). If YES is the answer at step S20, a control parameter for an undulating road is set (step S21). Thus, if it is judged that the vehicle is running at high speed on a road surface containing both a bad road component αa and an undulating road component αu (i.e. the road surface is rough and undulating), a control gain K for an undulating road is set with priority relative to setting of a control gain K for a bad road (to attain "hard" damping force characteristics), thereby ensuring favorable steering stability.

When the vehicle is running at high speed, a low-frequency component (undulating road component αu) is readily transmitted, whereas a high-frequency component (bad road component αa) is not easily transmitted. According to this embodiment, when it is judged that the vehicle is running at high speed on a road surface containing both a bad road component αa and an undulating road component αu (i.e. the road surface is rough and undulating), a control gain K for an undulating road is set with priority relative to setting of a control gain K for a bad road, thereby reliably ensuring favorable steering stability.

Figure 14B:
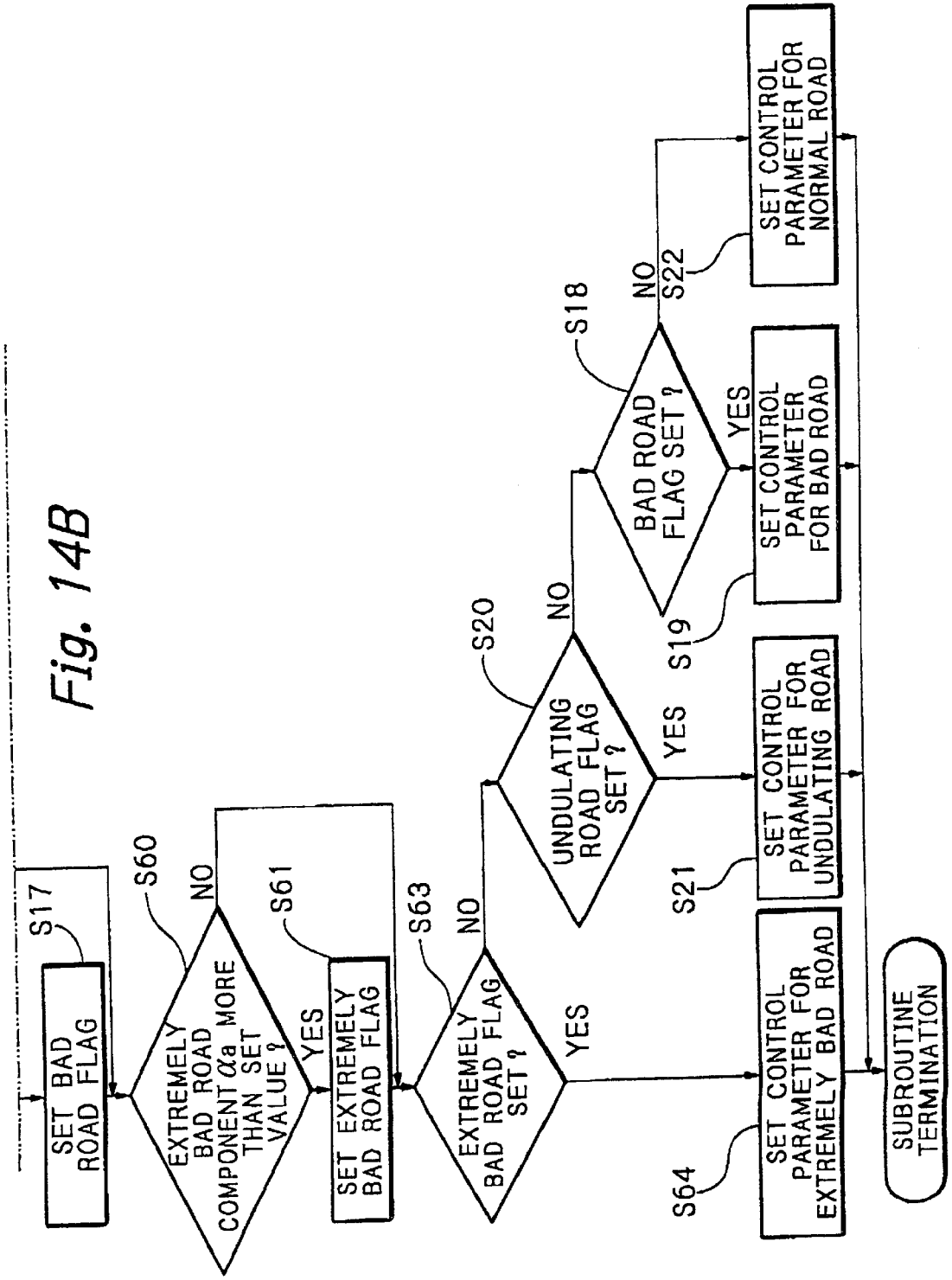
FIG. 14 is a flowchart showing a third embodiment of the present invention.

Next, a third embodiment of the present invention will be described with reference to FIGS. 14 and 15.

Figure 15:
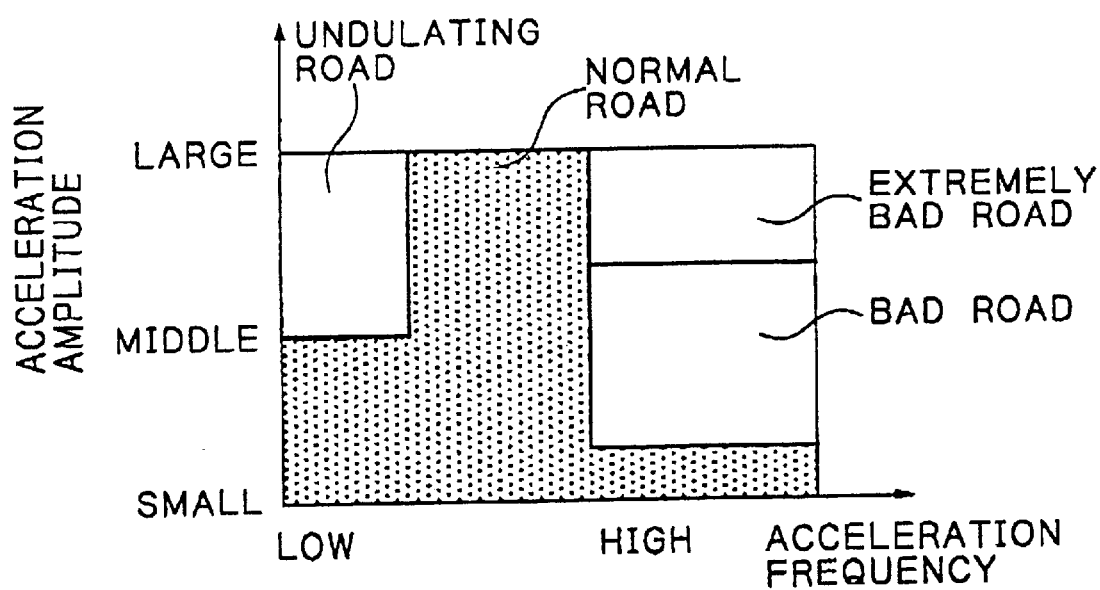
FIG. 15 is a diagram schematically showing road surface condition judgment criteria in the third embodiment.

According to the third embodiment, road surface conditions are classified into four categories, inclusive of "extremely bad road", as shown in FIG. 15 and Table 2 below, thereby improving the control accuracy in comparison to the first embodiment. The third embodiment further differs from the first embodiment (FIG. 4) in that it includes processing regarding "extremely bad road", e.g. a judgment as to whether or not the present road surface is extremely rough, as shown in FIG. 14, and that the frequency calculating unit 11 and so forth perform processing described below.

TABLE 2

|  | Amplitude of acceleration signal α | Frequency of acceleration signal α |
|---|---|---|
| Undulating road | middle to large | low |
| Bad road | small to middle | high |
| Extremely bad road | large | high |
| Normal road | Other than the above | |

According to third embodiment, the frequency calculating unit 11 has reference range data Tu for an undulating road, reference range data Ta for a bad road, and reference range data Tg for an extremely bad road. The reference range data Tg for an extremely bad road has a larger value as an amplitude level than the reference range data for Ta for a bad road. The frequency calculating unit 11 calculate frequencies (frequencies for judgment) Fa and Fg by using a bad road component αa (containing also an extremely bad road component αg) extracted at step S12A. More specifically, the number of times the bad road component αa falls within the reference range data Ta for a bad road is calculated to determine Fa. Similarly, the number of times the bad road component αa falls within the reference range data Tg for an extremely bad road is calculated to determine Fg. The judging unit 12 compares the frequencies Fa and Fg for judgment with preset values, respectively, to judge the road surface to be a bad road or an extremely bad road (steps S16 and S17).

The parameter adjusting unit 13 in the third embodiment adjusts the above-described control gain K according to the result of the judgment made by the judging unit 12. When the judging unit 12 judges that "the road surface is undulating", the parameter adjusting unit 13 sets a control gain K for an undulating road (i.e. a control gain K for improving vibration-damping properties). When the judging unit 12 judges that "the road surface is rough", the parameter adjusting unit 13 sets a control gain K for a bad road (i.e. a control gain K for preventing the ride quality from degrading). When the judging unit 12 judges that "the road surface is extremely rough", the parameter adjusting unit 13 sets a control gain K for an extremely bad road (i.e. a control gain K for suppressing over-damping to ensure favorable ride quality and prevent the vehicle from behaving disorderedly). When the result of the judgment contains three decisions, i.e. "extremely bad road ", "bad road" and "undulating road", control for an extremely bad road (i.e. setting of a control gain K for an extremely bad road) is effected with the highest priority. Then, control for an undulating road (i.e. setting of a control gain K for an undulating road) is effected with priority relative to the control for a bad road. Finally, control for a bad road (i.e. setting of a control gain K for a bad road) is effected. Thus, the order of priority has been given to each control process as described below.

More specifically, the third embodiment has steps S11A and S12A in place of steps S11 and S12 in FIG. 4. As shown in FIG. 14, an undulating road flag, a bad road flag and an extremely bad road flag are cleared at step S11A, and an undulating road component $\alpha u$, a bad road component $\alpha a$ and an extremely bad road component $\alpha g$ are extracted at step S12A (extraction device).

If NO is the answer at step S16 (at which a judgment is made as to whether or not the number of times the bad road component $\alpha a$ falls within the reference range data Ta for a bad road in a predetermined time is more than a set value), or if the process at step S17 (at which a bad road flag is set), or executed, step S63 is executed in place of step S18 in FIG. 4. If YES is the answer at step S63, a control parameter for an extremely bad road is set (step S64).

If NO is the answer at step S63, processing thereafter is executed according to the same procedure as shown in FIG. 13.

According to the third embodiment, when it is judged that the vehicle is running on a road surface having simultaneously three road conditions, i.e. an undulating road component $\alpha u$, a bad road component $\alpha a$ and an extremely bad road component $\alpha g$, control for an extremely bad road (i.e. control by a control gain K for suppressing over-damping to ensure favorable ride quality and prevent the vehicle from behaving disorderedly) is effected with priority relative to the control for an undulating road and control for a bad road, thereby ensuring favorable ride quality and favorable behavior of the vehicle.

When it is judged that the vehicle is running on a road surface having both an undulating road component $\alpha u$ and an extremely bad road component $\alpha g$, or it is judged that the vehicle is running on a road surface having both a bad road component $\alpha a$ and an extremely bad road component $\alpha g$, control for an extremely bad road is effected with priority relative to the control for an undulating road or the control for a bad road, thereby ensuring favorable ride quality and favorable behavior of the vehicle.

When it is judged that the vehicle is running on a road surface having both an undulating road component $\alpha u$ and a bad road component $\alpha a$, control for an undulating road (with a control gain K for improving vibration-damping properties) is effected with priority to the control for a bad road to ensure favorable vibration-damping properties, thereby improving steering stability.

When the result of the judgment contains a plurality of decisions, i.e. when it is judged that "the road surface has an undulating road component $\alpha u$, a bad road component $\alpha a$ and an extremely bad road component $\alpha g$", it is not always clear with the above-described prior art which of control processes will be executed, i.e. control based on the undulating road component $\alpha u$, control based on the bad road component $\alpha a$, or control based on the extremely bad road component $\alpha g$, and it is likely to fail to effect control according to the degree of importance. In contrast, according to this embodiment, when the result of the judgment contains a plurality of decisions, it is possible to effect control according to the degree of importance (in the order of priority: ① control for an extremely bad road; ② control for an undulating road; and ③ control for a bad road). Accordingly, the driver and other occupants will not have an uneasy feeling.

According to the present invention, when the levels of at least two of various vibration components simultaneously exceed the respective predetermined values, damping force is controlled according to predetermined order or priority. Therefore, it is possible to appropriately control the damping force of the shock absorber according to the degree of importance. Accordingly, the driver and other occupants will not have an uneasy feeling.

According to the present invention, the damping force control device effects damping force control for a high-frequency vibration component with priority relative to damping force control for a low-frequency vibration component, thereby attaining "soft" damping force characteristics. Consequently, ride quality can be improved. Moreover, it is possible to surely avoid a situation that "it is not clear which of control processes will be executed, i.e. control for an undulating road or control for a bad road", which may be experienced with the prior art.

According to the present invention, when the vehicle speed is low, the damping force control device effects damping force control for a high-frequency vibration component with priority relative to damping force control for a low-frequency vibration component, whereas when the vehicle speed is high, the damping force control device effects damping force control for a low-frequency vibration component with priority relative to damping force control for a high-frequency vibration component. Consequently, when the vehicle is running at low speed, at which a low-frequency component (undulating road component) is not easily transmitted, whereas a high-frequency component (bad road component) is readily transmitted, favorably ride quality is reliably ensured. When the vehicle is running at high speed, at which a low-frequency component (undulating road component) is readily transmitted, whereas a high-frequency component (bad road component) is not easily transmitted, favorable steering stability is reliably ensured.

What is claimed is:

1. A suspension control system, comprising:
   a shock absorber to be interposed between a body of a vehicle and an axle, wherein the shock absorber is capable of generating a damping force;
   a road surface condition detecting system to generate a signal corresponding to road surface conditions;
   an extraction device to extract from the signal that is generated by the road surface condition detecting system, a high-frequency vibration component corresponding to a first road surface condition, and a low-frequency vibration corresponding to a second road surface condition; and
   a control system to send a signal to the shock absorber to generate the damping force in response to each of said high-frequency and low-frequency vibration components when a respective level of said high-frequency and low-frequency vibration components exceeds a predetermined respective value, wherein
   (i) when vehicle speed is below a certain level, and the respective level of each of said high-frequency and low-frequency vibration components simultaneously exceeds its predetermined respective value, the control system is to send a signal to the shock absorber to generate the damping force in response to the high-frequency vibration component; and (ii) when the vehicle speed is at or above the certain level, and the respective level of each of said high-frequency and low-frequency vibration components simultaneously exceeds its predetermined respective value, the control system is to send a signal to the shock absorber to generate the damping force in response to the low-frequency vibration component.

2. The suspension control system according to claim 1, wherein said control system is to send the signal to generate the damping force in response to the high-frequency vibration component when the vehicle speed is at or above said certain level and the respective level of the low-frequency vibration component is at or below its predetermined respective value, and wherein said control system is to send the signal to generate the damping force in response to the low-frequency vibration component when the vehicle speed is below the certain level and the respective level of the high-frequency vibration component is at or below its predetermined respective value.

3. The suspension control system according to the claim 1, wherein said road surface condition detecting system includes an acceleration sensor to generate the signal corresponding to the road surface conditions.

4. The suspension control system according to claim 1, wherein said extraction device includes a low-pass filter to extract the low-frequency vibration component, and a high-pass filter to extract the high-frequency vibration component.

5. A suspension control system, comprising:

a shock absorber to be interposed between a body of a vehicle and an axle, wherein the shock absorber is capable of generating a damping force;

a road surface condition detecting system for generating a signal corresponding to road surface conditions;

an extraction device to extract from the signal that is generated by the road surface condition detecting system, a first vibration component corresponding to a first road surface condition, a second vibration component corresponding to a second road surface condition, and a third vibration component corresponding to a third road surface condition; and a control system to send a signal to the shock absorber to generate the damping force in response to each of the first, second and third vibration components when a respective level of the first, second and third vibration components exceeds a predetermined respective value, wherein (i) when the respective level of the first and at least one of the second and third vibration components simultaneously exceeds its predetermined respective value, the control system is to send a signal to the shock absorber to generate the damping force in response to the first vibration component, and (ii) when the respective level of each of the second and third vibration components simultaneously exceeds its predetermined respective value, and the respective level of the first vibration component is at or below its predetermined respective value, the control system is to send a signal to the shock absorber to generate the damping force in response to the second vibration component.

6. The suspension control system according to claim 5, wherein the first vibration component is a first high-frequency vibration component, the second vibration component is a low-frequency vibration component, and the third vibration component is a second high-frequency vibration component having an amplitude less than the amplitude of the first high-frequency vibration component.

7. The suspension control system according to claim 5, wherein said road surface condition detecting system includes an acceleration sensor to generate the signal corresponding to the road surface conditions.

8. The suspension control system according to claim 5, wherein said extraction device includes a low-pass filter to extract the low-frequency vibration component, and a high-pass filter to extract the first high-frequency vibration component and the second high-frequency vibration component.

9. A method for controlling a damping force generated by a shock absorber interposed between a body of a vehicle and an axle, comprising:

generating a signal corresponding to road surface conditions;

extracting from the generated signal at least one of a high-frequency vibration component corresponding to a first road surface condition, and a low-frequency vibration component corresponding to a second road surface condition; and causing the shock absorber to generate a damping force in response to each of said high-frequency and low-frequency vibration components when a respective level of said high-frequency and low-frequency vibration components exceeds a predetermined respective value, wherein (i) when vehicle speed is below a certain level, and the respective level of each of said high-frequency and low-frequency vibration components simultaneously exceeds its predetermined respective value, the damping force is generated in response to the high-frequency vibration component, and (ii) when vehicle speed is at or above the certain level, and the respective level of each of said high-frequency and low-frequency vibration components simultaneously exceeds its predetermined respective value, the damping force is generated in response to the low-frequency vibration component.

10. The method according to claim 9, further wherein when the vehicle speed is below the certain level, and the respective level of the high-frequency vibration component is at or below its predetermined respective value, the damping force is generated in response to the low-frequency vibration component, and when the vehicle speed is at or above the certain level, and the respective level of the low-frequency vibration component is at below its predetermined respective value, the damping force is generated in response to the high-frequency vibration component.

11. The method according to claim 9, wherein the generating includes using an acceleration sensor to generate an acceleration signal that corresponds to road surface conditions.

12. The method according to claim 9, wherein the extracting includes using a low-pass filter to extract the low-frequency vibration component from the acceleration signal, and using a high-pass filter to extract the high-frequency vibration component from the acceleration signal.

13. A method for controlling a damping force generated by a shock absorber interposed between a body of a vehicle and an axle, comprising:

generating a signal corresponding to road surface conditions;

extracting from the generated signal at least one of, a first vibration component corresponding to a first road surface condition, a second vibration component corresponding to a second road surface condition, and a third vibration component corresponding to a third road surface condition;

causing the shock absorber to generate a damping force in response to each of said first, second and third vibration components when a respective level of said first, second and third vibration components exceeds a predetermined respective value, wherein (i) when the respective level of the first and at least one of the second and third vibration components simultaneously exceeds its predetermined respective value, the damping force is generated in response to the first vibration component, and (ii) when the respective level of each of the second and third vibration components simultaneously exceeds its predetermined respective value, and the respective value of the first vibration component is at or below its predetermined respective value, the damping force is generated in response to the second vibration component.

14. The method according to claim 13, wherein the first vibration component is a first high-frequency vibration component, the second vibration component is a low-frequency vibration component, and the third vibration component is a second high-frequency vibration component having an amplitude that is less than the amplitude of the first high-frequency vibration component.

15. The method according to claim 13, wherein the generating includes using an acceleration sensor to generate an acceleration signal that corresponds to road surface conditions.

16. The method according to claim 13, wherein the extracting includes using a low-pass filter to extract the low-frequency vibration component from the acceleration signal, using a high-pass filter to extract the first high-frequency vibration component from the acceleration signal, and using a high-pass filter to extract the second high-frequency vibration component from the acceleration signal.

* * * * *